US009225623B2

(12) United States Patent
Sokolik et al.

(10) Patent No.: US 9,225,623 B2
(45) Date of Patent: Dec. 29, 2015

(54) PROCESSING DIAGNOSTICS OF MEDIA SERVICES (71) Applicant: AT&T Intellectual Property I, LP, Atlanta, GA (US)

(72) Inventors: Bryan Sokolik, O Fallon, MO (US); Brian Dean Freeman, Farmingdale, NJ (US); Robert Velazquez, Antioch, CA (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 263 days.

(21) Appl. No.: 14/041,254

(22) Filed: Sep. 30, 2013

(65) Prior Publication Data
US 2015/0095704 A1    Apr. 2, 2015

(51) Int. Cl.
*G06F 11/00* (2006.01)
*H04L 12/26* (2006.01)
*G06F 11/07* (2006.01)
*G06F 11/30* (2006.01)

(52) U.S. Cl.
CPC ........ *H04L 43/0847* (2013.01); *G06F 11/0709* (2013.01); *G06F 11/079* (2013.01); *G06F 11/30* (2013.01)

(58) Field of Classification Search
USPC ............................... 714/48, 47.1, 2
See application file for complete search history.

(56) References Cited

U.S. PATENT DOCUMENTS

| 5,574,495 | A | 11/1996 | Caporizzo | |
|---|---|---|---|---|
| 6,734,898 | B2 | 5/2004 | Zeidler | |
| 6,970,924 | B1 | 11/2005 | Chu et al. | |
| 7,630,308 | B1 * | 12/2009 | Loher | 370/230.1 |
| 8,191,099 | B2 | 5/2012 | Johnson et al. | |
| 8,225,362 | B2 | 7/2012 | Mehta | |
| 8,352,995 | B2 | 1/2013 | Sadja et al. | |
| 8,935,581 | B2 * | 1/2015 | Orzell et al. | 714/57 |
| 2007/0094142 | A1 * | 4/2007 | Russell et al. | 705/52 |
| 2007/0283401 | A1 | 12/2007 | Lee | |
| 2008/0288977 | A1 | 11/2008 | Howcroft et al. | |
| 2009/0089852 | A1 | 4/2009 | Randolph et al. | |
| 2011/0088072 | A1 | 4/2011 | Mehta | |
| 2012/0320222 | A1 | 12/2012 | Nakamichi et al. | |
| 2013/0174203 | A1 | 7/2013 | Ozawa | |
| 2013/0185761 | A1 | 7/2013 | Friel et al. | |

FOREIGN PATENT DOCUMENTS

KR    2013059786    6/2013

* cited by examiner

Primary Examiner — Sarai Butler
(74) Attorney, Agent, or Firm — Guntin & Gust, PLC; Jay H. Anderson (57) ABSTRACT A system that incorporates the subject disclosure may include, for example, a device receiving diagnostic information from a plurality of client devices delivering media content, wherein the diagnostic information relates to a media delivery service quality and wherein the diagnostic information is sent automatically by the client devices; performing a data compression procedure for the diagnostic information; transmitting compressed data comprising the diagnostic information to an aggregator device; and sending to the client devices a message to delay or prevent transmission of additional diagnostic information in accordance with an instruction received from the aggregator device. Other embodiments are disclosed.

20 Claims, 10 Drawing Sheets

PROCESSING DIAGNOSTICS OF MEDIA SERVICES

FIELD OF THE DISCLOSURE

The subject disclosure relates to measuring and reporting the quality of media services delivered to clients, and more particularly to a system for processing diagnostic reports of errors or failures in delivery of those services.

BACKGROUND

Diagnostics for networks delivering media content to client devices, such as networks with servers communicatively coupled to client devices which may include set top boxes (STBs), tablets, personal computers (PCs), mobile devices, smart TV, etc., typically involve periodic polling of the client devices. The client devices generally include rolling counters for logging diagnostic information. Events such as reboots and channel changes can alter or reset those counters. Network outages cause increases in diagnostic polling of the client devices. Outage events can alter usage patterns for various components of the video distribution network, servers, and client devices.

BRIEF DESCRIPTION OF THE DRAWINGS

Reference will now be made to the accompanying drawings, which are not necessarily drawn to scale, and wherein.

DETAILED DESCRIPTION

The subject disclosure describes, among other things, illustrative embodiments of a method and system for automated publication of diagnostic reports on a network (for example, from client devices on a video network). Other embodiments are included in the subject disclosure.

One embodiment of the subject disclosure includes a method comprising receiving, by a collector device comprising a processor, diagnostic information from a plurality of client devices delivering media content, wherein the diagnostic information relates to a media delivery service quality; performing, by the collector device, a data compression procedure for the diagnostic information; transmitting, by the collector device, compressed data comprising the diagnostic information to an aggregator device; and sending, by the collector device, to the client devices a message to delay or prevent transmission of additional diagnostic information in accordance with an instruction received from the aggregator device, wherein the diagnostic information is sent automatically by each client device to the collector device periodically at a variable interval or in accordance with a change of state of the client device, and wherein the diagnostic information comprises a report of a degradation of the service quality or a fault relating to the service quality.

One embodiment of the subject disclosure includes a server comprising a memory to store instructions and a processor coupled to the memory. The processor, responsive to executing the instructions, performs operations. The operations comprise receiving client reports published by client devices on a network for delivering media content to the client devices, wherein the client reports comprise diagnostic information relating to a media delivery service quality; receiving additional reports from network components communicatively coupled to the server relating to the service quality; correlating the client reports and the additional reports to generate correlated diagnostic data; identifying a degradation of the service quality or a fault relating to the service quality based on the correlated diagnostic data; and determining that publication of subsequent client reports regarding the degradation of the service quality or the fault is to be delayed or suppressed.

One embodiment of the subject disclosure includes a tangible computer-readable storage device comprising executable instructions. The instructions, when executed by a processor, cause the processor to perform operations. The operations comprise receiving diagnostic information from a plurality of client devices delivering media content, wherein the diagnostic information relates to a media delivery service quality and wherein the diagnostic information is sent automatically by the client devices; performing a data compression procedure for the diagnostic information; transmitting compressed data comprising the diagnostic information to an aggregator device; and sending to the client devices a message to delay or prevent transmission of additional diagnostic information in accordance with an instruction received from the aggregator device.

Figure 1:
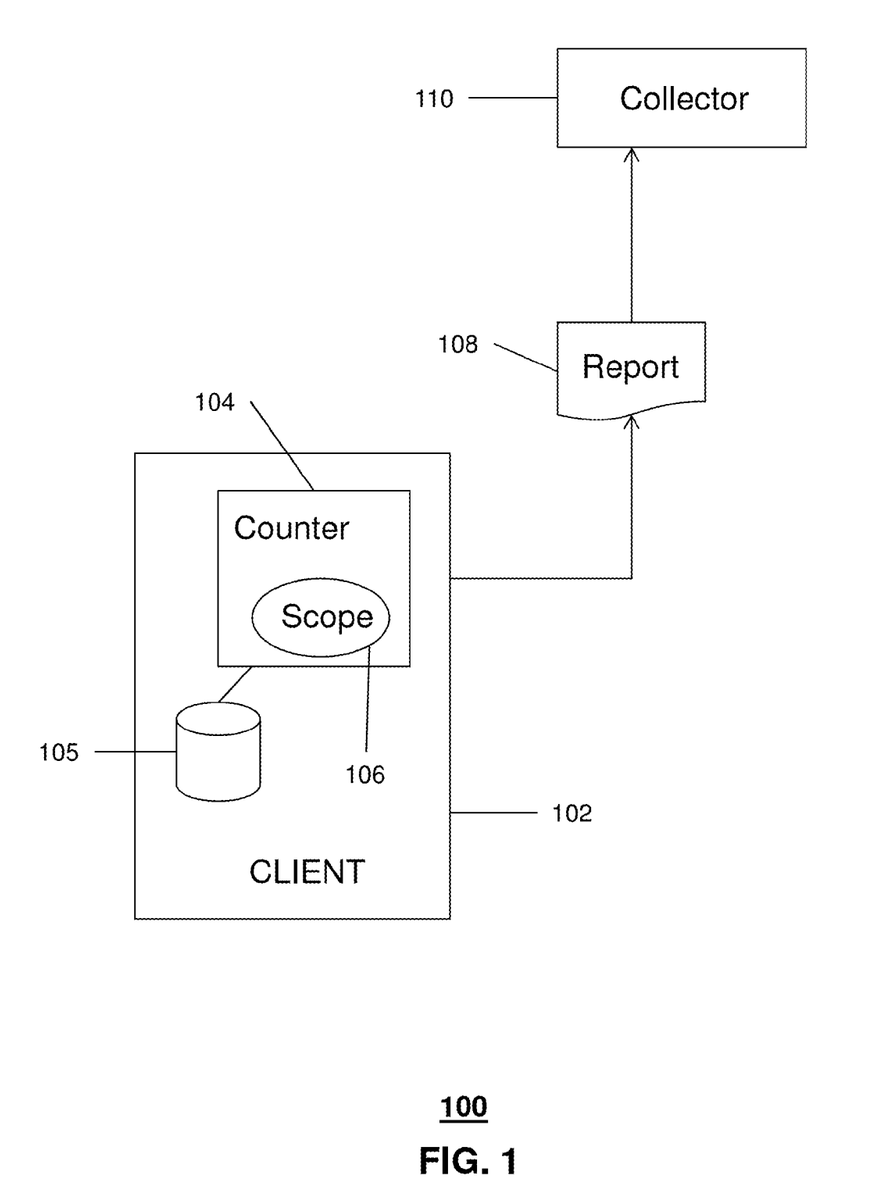
FIG. 1 schematically illustrates a client device publishing a report to a collector device, in accordance with an embodiment of the disclosure.

FIG. 1 is a schematic illustration of an arrangement 100 of a client device 102 that includes a counter 104. The client device is typically part of a network in which media services (audio, video or both) can be distributed. The counter detects and logs errors in the media service delivered to the client.

The types of events tracked by the counter, and the context in which those events are detected, is referred to herein as the scope 106 of the counter. For example, if the client device is a set top box (STB) receiving video data from the network, the scope of the counter for this device will include gaps or distortions in the video stream for a particular channel. When the scope changes on account of a reboot, a channel change, or some other event, the counter resets and any new errors will be associated with the new scope.

Event data logged by the counter 104 in accordance with the scope 106 can be stored in a storage device 105. (In the schematic illustration of FIG. 1, the storage device is included in the client device, but this is not required.) The client device uploads a report 108 of the logged data to a collector 110. The report can be uploaded (published) to the collector when a triggering event occurs (typically, a change in scope as defined for the device) or at periodic intervals. In this embodiment, reports are published at adjustable intervals (e.g. every 15 minutes), but are also published when a change in scope occurs. Publication of these reports is referred to herein as Automated Trouble Publish (ATP).

Reports of trouble (e.g., disruption of a video stream on a channel) are published by the client device without prompting from the collector (that is, reports are pushed as events occur, as opposed to pulled when needed by the collector). Accordingly, errors are logged and reported along with information regarding the scope in real time or near-real time, permitting detailed analysis by diagnostic devices on the network (including tracking historical data trends). A report can indicate a degradation in service quality or a fault relating to service quality (e.g. a soft fault such as a network timing protocol (NTP) timing error or a digital rights management (DRM) error).

Figure 2:
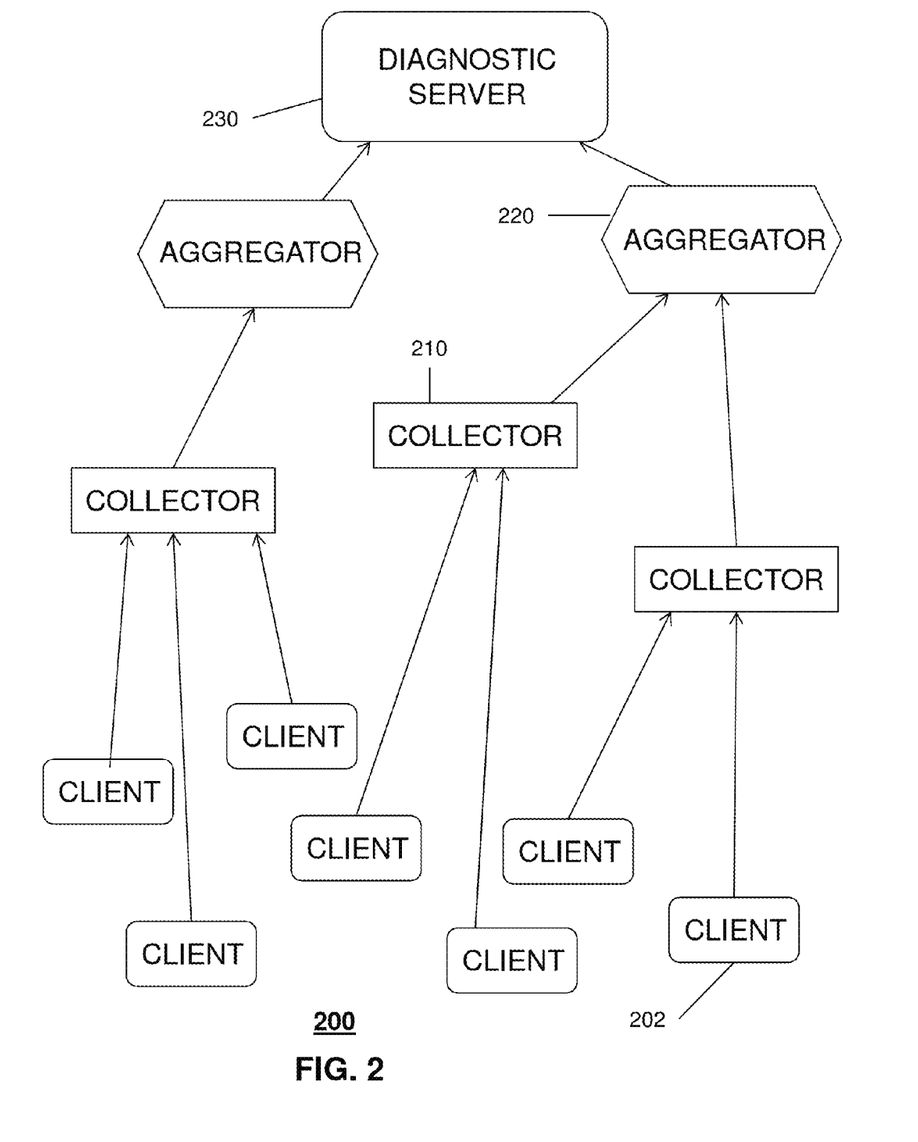
FIG. 2 schematically illustrates a distributed architecture for processing diagnostic information in a network, in accordance with an embodiment of the disclosure.

FIG. 2 depicts an architecture 200 for collecting, aggregating and analyzing trouble reports published by client devices, according to an embodiment of the disclosure. The architecture comprises four tiers: clients 202, collectors 210, aggregators 220, and diagnostic server 230. The clients publish diagnostic reports at periodic intervals (e.g. every 15 minutes) and/or when a predefined triggering event occurs. The collectors receive all the diagnostic reports published by the clients. In this embodiment, the clients and collectors belong to a video distribution network; the collectors are advantageously distributed across the video distribution network to minimize latency and impacts of upload traffic on the network. Cloud technologies may be used to implement one or more collectors to collect reports from all clients in the network, including over-the-top (OTT) clients and video clients not directly connected to the network.

In this embodiment, the collectors 210 have two broadly defined tasks: (1) Data collection: The collectors in a given region of the network receive and process diagnostic publications from all clients in that region. The data is compressed and made ready for aggregation. (2) Storm protection: Outages and impairments of service, and even scheduled maintenance, can cause significant spikes in the number of diagnostic publications (a "storm" of trouble reports). The collectors 210 are enabled to respond to clients with a "back off" message to delay or suppress transmission of further diagnostic publications (discussed in more detail below).

Aggregators 220 are at the next tier of the architecture 200. At this level, data is evaluated and combined to identify patterns indicative of an impairment or outage in network service. The aggregators further process the raw data to prepare it for use in overall diagnostic analysis of the platform and video experience. Data is also made available for correlation with other diagnostic information captured from server-side components. Data determined to be insufficient for further action may still be considered valuable. All data will be made available for Big Data storage and analytics, which can include performance analysis and long term trending of minor data reporting events.

Diagnostic server 230 is at the top tier of architecture 200. In this embodiment, diagnostic server 230 has several functions, comprising: (1) An application program interface (API) layer is made available for real-time diagnostic requests. APIs will be available for third-party applications to request real-time diagnostics for a particular device, client, or account. (2) The diagnostic server correlates data received from the aggregators. Data from distribution servers and clients is combined to provide a holistic view of the video experience. (3) Diagnostic server 230 provides procedures for offloading data to Big Data repositories for further analysis. (4) Diagnostic server 230 controls policies regarding when the data collected is considered sufficient to declare an outage or impairment of service (thereby triggering, for example, alarms to operators to create tickets and thereby drive resolution of the outage or impairment). This declaration can also trigger a response to the collectors to begin the "back off" procedure for diagnostic publications related to a particular scope.

Figure 3:
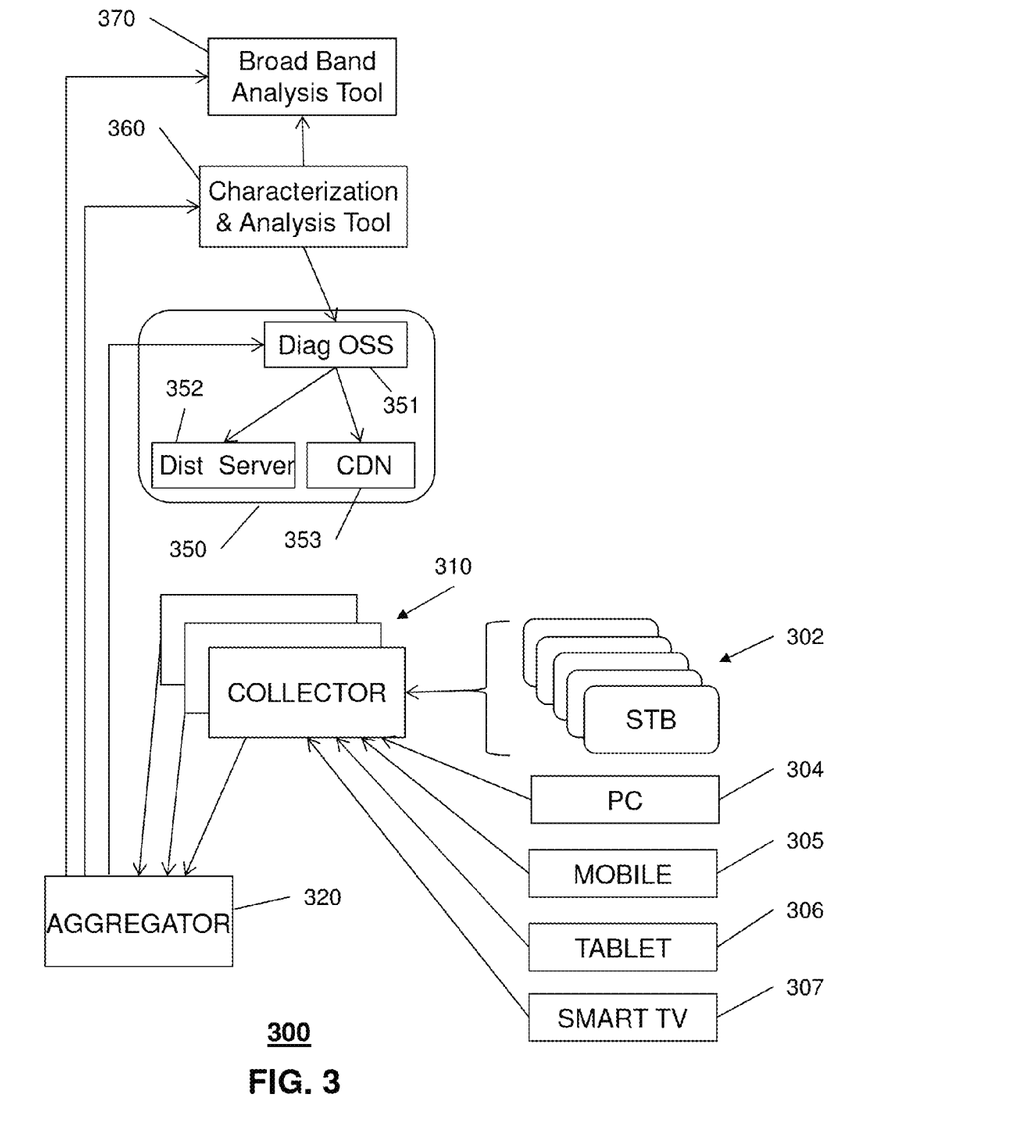
FIG. 3 schematically illustrates a system for collecting and processing diagnostic information in a network, in accordance with an embodiment of the disclosure.

FIG. 3 illustrates an implementation 300 of the architecture 200, in accordance with an embodiment of the disclosure. In this embodiment, the client devices include set top boxes (STB) 302 at various locations, and other devices including personal computer (PC) 304, mobile communication device 305, tablet computing device 306 and smart television 307. Each of the client devices has a counter; reports from a client device include data logged by the counter according to the scope for that counter. In general, the scope is defined differently for different types of devices.

The reports from the client devices are published to collectors 310. Data from the reports is compressed and transmitted to aggregator 320. In this embodiment, data processed by the aggregator is transmitted to a characterization and analysis tool 360, a network broad band analysis tool 370, and to a system 350 including a diagnostic server 351 (Diagnostic Operational Support System or Diag OSS). Diagnostic server 351 is communicatively coupled to distribution server (Dist Server) 352 and content delivery network (CDN) 352. The data from the aggregator received by system 350 comprises client-side error reports. System 350 also includes server side systems for tracking and logging errors and producing server-side error reports. Diagnostic server 351 correlates the client-side error reports with the server-side error reports to detect a service outage or service impairment.

Figure 4:
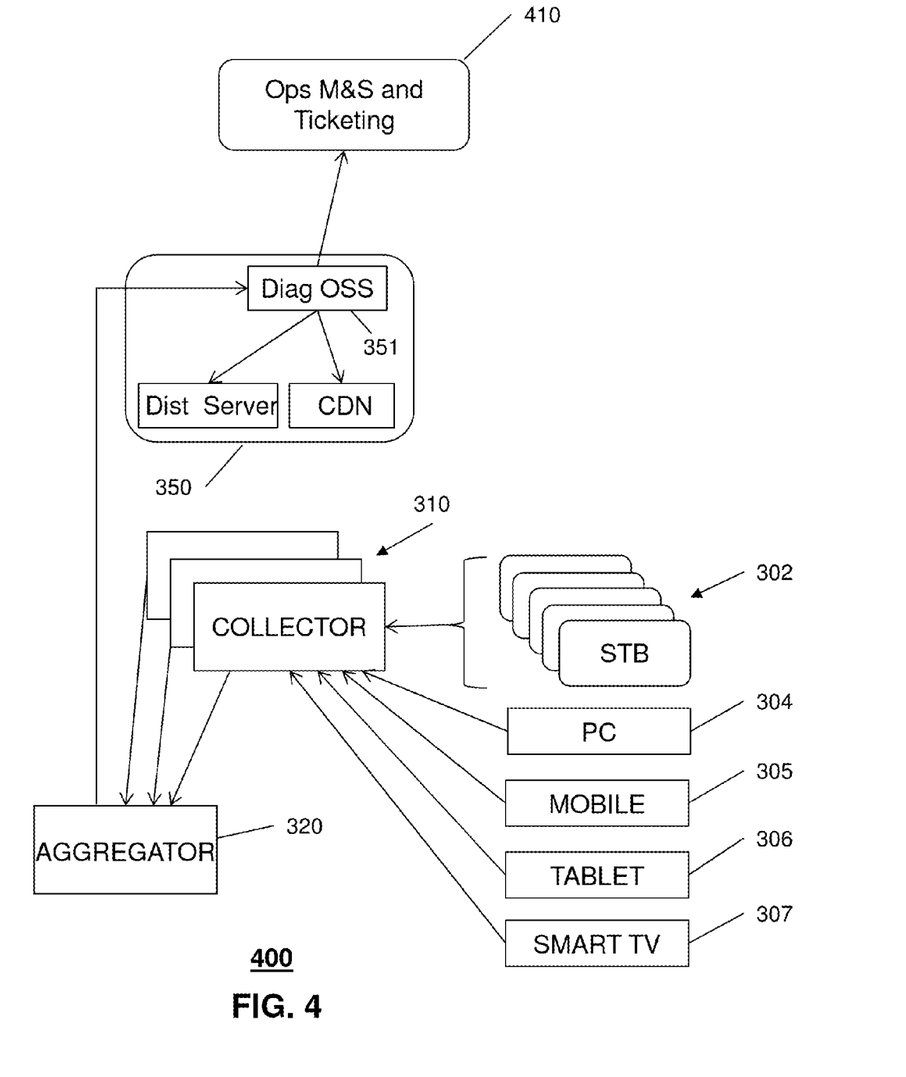
FIG. 4 schematically illustrates the system of FIG. 3 detecting and diagnosing a service outage or impairment in the network.

FIG. 4 illustrates a further implementation 400 in which system 350 (which includes diagnostic server 351) communicates with an Operations Maintenance and Support (Ops M&S) function 410. The Ops M&S function is directed to generate an alarm when a service outage or impairment is detected by the diagnostic server. In this embodiment, the Ops M&S function also generates a maintenance ticket so that network operators address the reported trouble.

Figure 5:
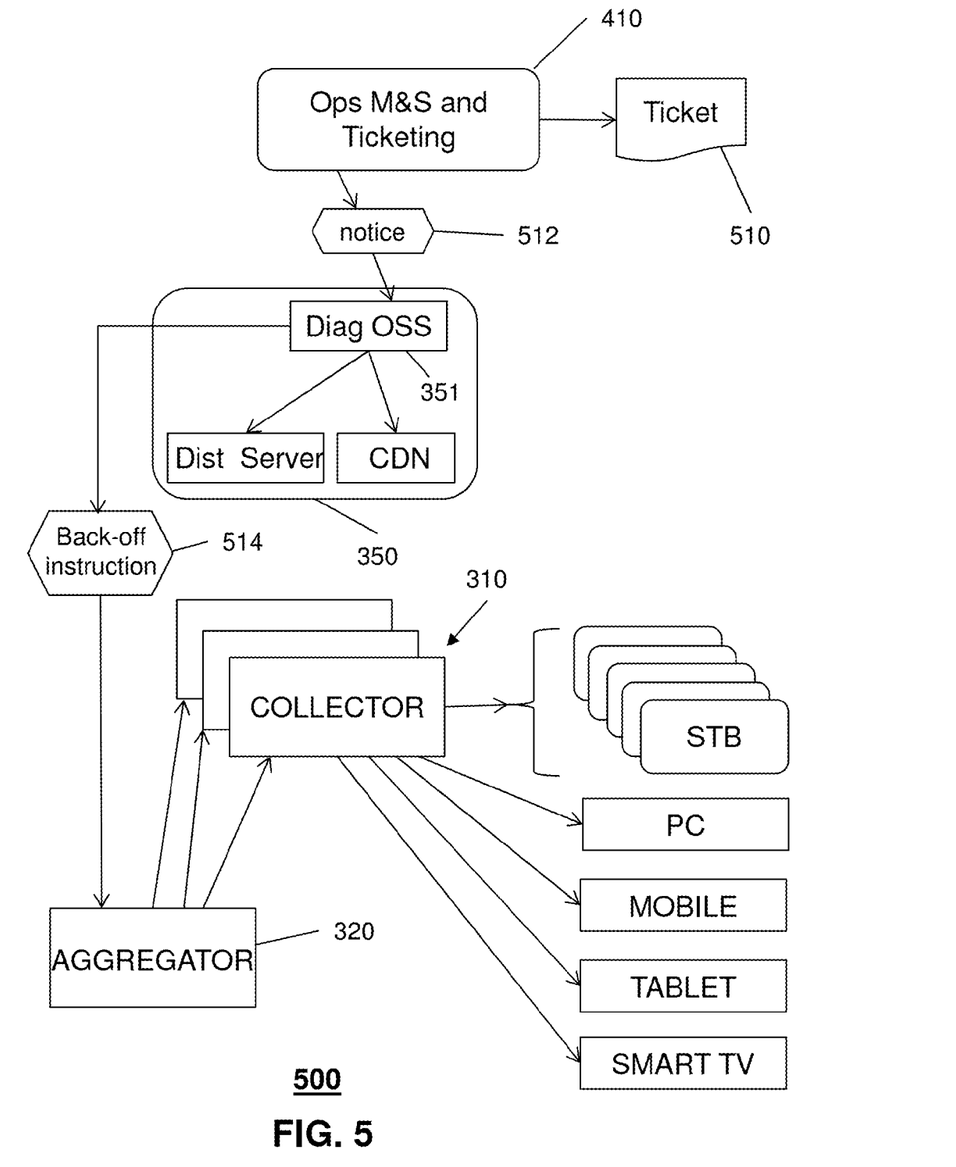
FIG. 5 schematically illustrates the system of FIG. 4 in which a back-off procedure has been invoked, in accordance with an embodiment of the disclosure.

FIG. 5 schematically illustrates an implementation 500 in which a back-off procedure is invoked. The Ops/Ticketing function, upon generating a ticket 510, sends a notice 512 to diagnostic server 351, requesting that further reports of the problem be suppressed. Diagnostic server 351 then sends a back-off instruction 714 to the aggregator 320. The collectors 310 are then enabled to suppress the client reports. In this embodiment, feedback from the ticketing function to the diagnostic server triggers suppression of the client reports of the network event addressed by the ticket.

Figure 6:
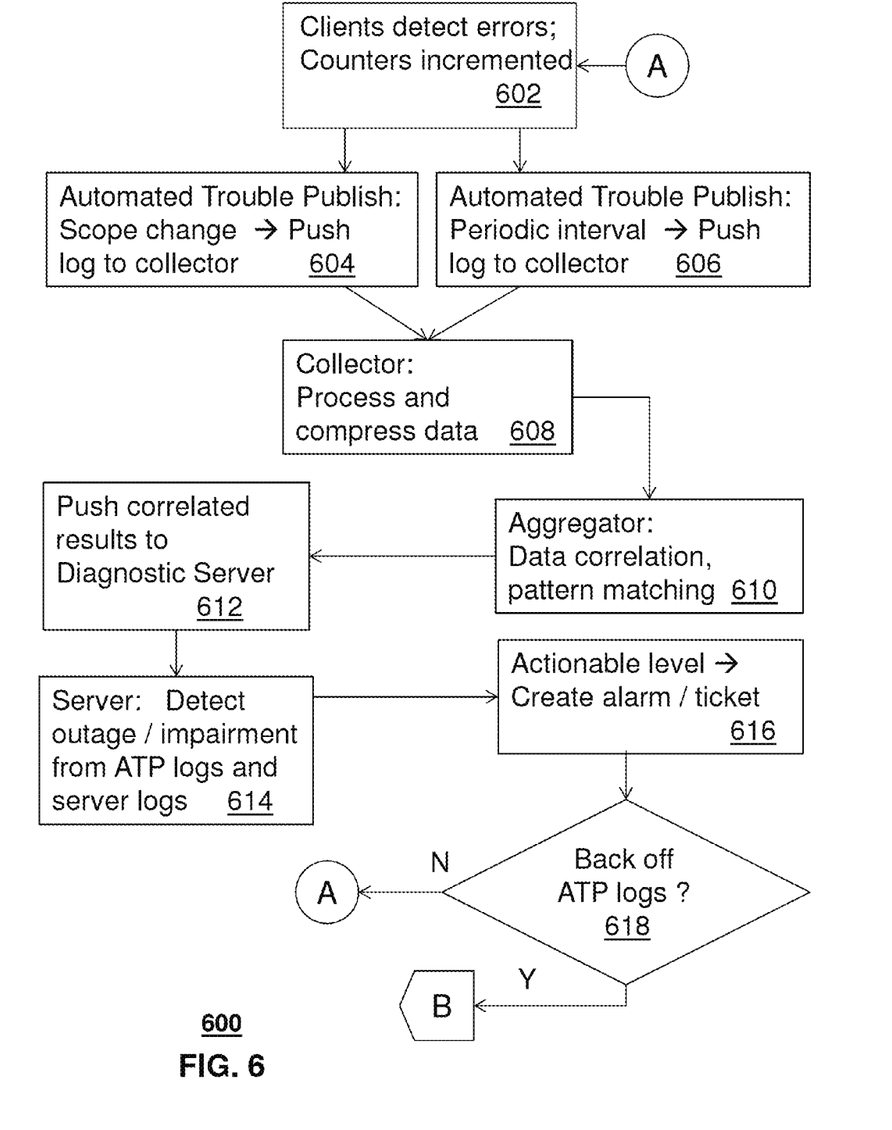
FIGS. 6 and 7 are connected flowcharts illustrating a procedure for detecting and diagnosing a service outage or impairment in a network, in accordance with an embodiment of the disclosure.

A procedure 600 for logging, publishing and processing error reports in a media distribution network, according to an embodiment of the disclosure, is shown in FIG. 6. As client devices detect errors, the counters of those devices are incremented (step 602). Error logs are maintained at the client devices in accordance with the scope of the media service asset being tracked (for example, audio quality on a particular cable television channel). The Automated Trouble Publish logs are published to a collector when there is a change in scope, e.g. a channel change (step 604) and/or periodically at expiration of a predetermined (adjustable) interval (step 606). The collector compresses the ATP report data (step 608) before sending the data to the aggregator.

The aggregator executes a pattern matching function (step 610) to search for commonalities in the incoming reports. In particular, the aggregator correlates reported events in the ATP logs to determine whether ATP logs from a plurality of different client devices relate to the same asset. The aggregator pushes the correlated results to the diagnostic server (step 612). The diagnostic server detects a service outage or service impairment using information from the ATP logs and server-side error logs (step 614). The diagnostic server determines whether a problem exists and decides at what level (measured by the number of reports received) the problem is actionable. When the problem is determined to be actionable, the diagnostic server causes an alarm and/or a maintenance ticket to be created (step 616).

Once a problem has been sufficiently reported and identified, it may not be necessary to process additional reports relating to that problem. The diagnostic server determines (step 618) whether a back off procedure should be invoked—that is, not receive or process further reports relating to the problem. This determination can be made according to a predefined rule (for example, back off when a threshold number of reports are received). Alternatively, the decision to back off can be made by network operators. In another embodiment, the decision can be to continue receiving client reports, but to suppress further notifications to the Ops/Ticketing function. In another embodiment, a determination to instruct client devices to delay or suppress reports may come from outside the system. For example, network fault surveillance systems and/or network ticketing layers that have further correlated the video diagnostic data with other network data can advise that no further diagnostic data is needed.

Figure 7:
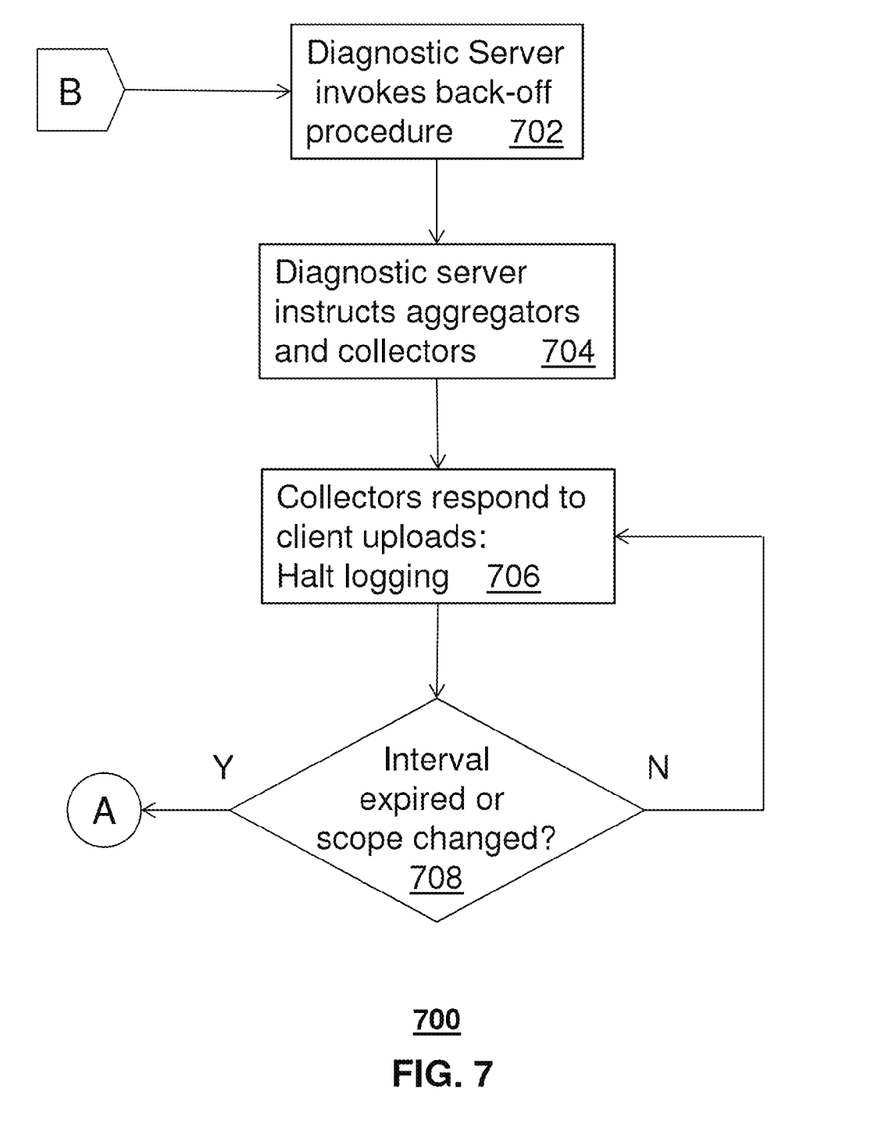

Steps in a back off procedure 700 are shown in FIG. 7. In this embodiment, the diagnostic server invokes a back-off procedure after a ticket is created (step 702). The diagnostic server then instructs the aggregators and collectors (step 704) to initiate the back-off process. The collectors will then respond to clients' uploading subsequent ATP logs (step 706) with an indication that logging should be halted for the particular scope involved for some set interval of time. In an embodiment, the collector sends the client an acknowledgment with a first type of flag when reports are pushed to the collector and received normally, and a second type of flag to indicate that logging should be halted for that scope. The back-off procedure can continue for a prescribed period of time, or until the scope changes (step 708). It will be appreciated that if the ATP reports pertain to a particular channel and a change in scope is due to a channel change, subsequent trouble reports (after the change in scope) should be published since they may indicate a new problem.

Figure 8:
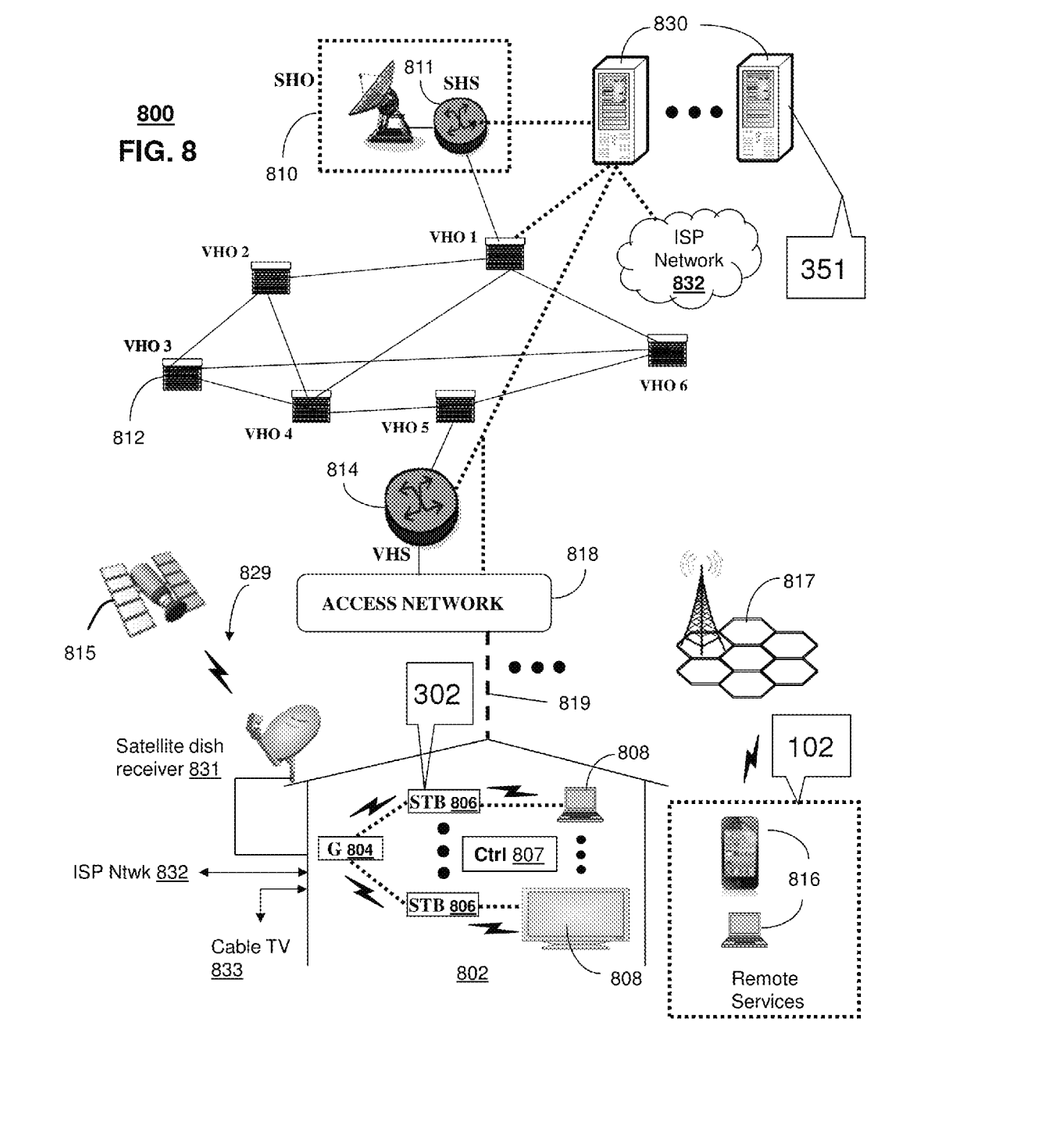
FIG. 8 depicts an illustrative embodiment of a communication system that provides media services to the client devices schematically illustrated in FIGS. 1-5.

FIG. 8 depicts an illustrative embodiment of a communication system 800 for delivering media content. The communication system 800 can represent an Internet Protocol Television (IPTV) media system. Communication system 800 can be overlaid or operably coupled with the systems schematically illustrated in FIGS. 3 and 4 as another representative embodiment of the disclosure. In particular, communication system 800 can include a server comprising a memory to store instructions and a processor coupled to the memory, wherein the processor, responsive to executing the instructions, performs operations; the operations comprise receiving client reports published by client devices on a network for delivering media content to the client devices, wherein the client reports comprise diagnostic information relating to a media delivery service quality; receiving additional reports from network components communicatively coupled to the server relating to the service quality; correlating the client reports and the additional reports to generate correlated diagnostic data; identifying a degradation of the service quality or a fault relating to the service quality based on the correlated diagnostic data; and determining that publication of subsequent client reports regarding the degradation of the service quality or the fault is to be delayed or suppressed.

The IPTV media system can include a super head-end office (SHO) 810 with at least one super headend office server (SHS) 811 which receives media content from satellite and/or terrestrial communication systems. In the present context, media content can represent, for example, audio content, moving image content such as 2D or 3D videos, video games, virtual reality content, still image content, and combinations thereof. The SHS server 811 can forward packets associated with the media content to one or more video head-end servers (VHS) 814 via a network of video head-end offices (VHO) 812 according to a multicast communication protocol.

The VHS 814 can distribute multimedia broadcast content via an access network 818 to commercial and/or residential buildings 802 housing a gateway 804 (such as a residential or commercial gateway). The access network 818 can represent a group of digital subscriber line access multiplexers (DSLAMs) located in a central office or a service area interface that provide broadband services over fiber optical links or copper twisted pairs 819 to buildings 802. The gateway 804 can use communication technology to distribute broadcast signals to media processors 806 such as Set-Top Boxes (STBs) which in turn present broadcast channels to media devices 808 such as computers or television sets managed in some instances by a media controller 807 (such as an infrared or RF remote controller).

The gateway 804, the media processors 806, and media devices 808 can utilize tethered communication technologies (such as coaxial, powerline or phone line wiring) or can operate over a wireless access protocol such as Wireless Fidelity (WiFi), Bluetooth, Zigbee, or other present or next generation local or personal area wireless network technologies. By way of these interfaces, unicast communications can also be invoked between the media processors 806 and subsystems of the IPTV media system for services such as video-on-demand (VoD), browsing an electronic programming guide (EPG), or other infrastructure services.

A satellite broadcast television system 829 can be used in the media system of FIG. 8. The satellite broadcast television system can be overlaid, operably coupled with, or replace the IPTV system as another representative embodiment of communication system 800. In this embodiment, signals transmitted by a satellite 815 that include media content can be received by a satellite dish receiver 431 coupled to the building 802. Modulated signals received by the satellite dish receiver 831 can be transferred to the media processors 806 for demodulating, decoding, encoding, and/or distributing broadcast channels to the media devices 808. The media processors 806 can be equipped with a broadband port to an Internet Service Provider (ISP) network 832 to enable interactive services such as VoD and EPG as described above.

In yet another embodiment, an analog or digital cable broadcast distribution system such as cable TV system 833 can be overlaid, operably coupled with, or replace the IPTV system and/or the satellite TV system as another representative embodiment of communication system 800. In this embodiment, the cable TV system 833 can also provide Internet, telephony, and interactive media services.

The subject disclosure can apply to other present or next generation over-the-air and/or landline media content services system.

Some of the network elements of the IPTV media system can be coupled to one or more computing devices 830, a portion of which can operate as a web server for providing web portal services over the ISP network 832 to wireline media devices 808 or wireless communication devices 816. In particular, communication system 800 can provide for all or a portion of the computing devices 830 to function as system 350 (see FIG. 3), including diagnostic server 351. As described above, the diagnostic server 351 can use computing and communication technology to perform processing and correlating ATP reports and server-side reports, which can include among other things, detecting a service outage or service impairment, and creating an alarm and/or ticket to resolve the reported trouble. In this embodiment, the media processors 806 and wireless communication devices 816 are examples of client devices 102, 302 as shown in FIGS. 1 and 3.

Multiple forms of media services can be offered to media devices over landline technologies such as those described above. Additionally, media services can be offered to media devices by way of a wireless access base station 817 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 9:
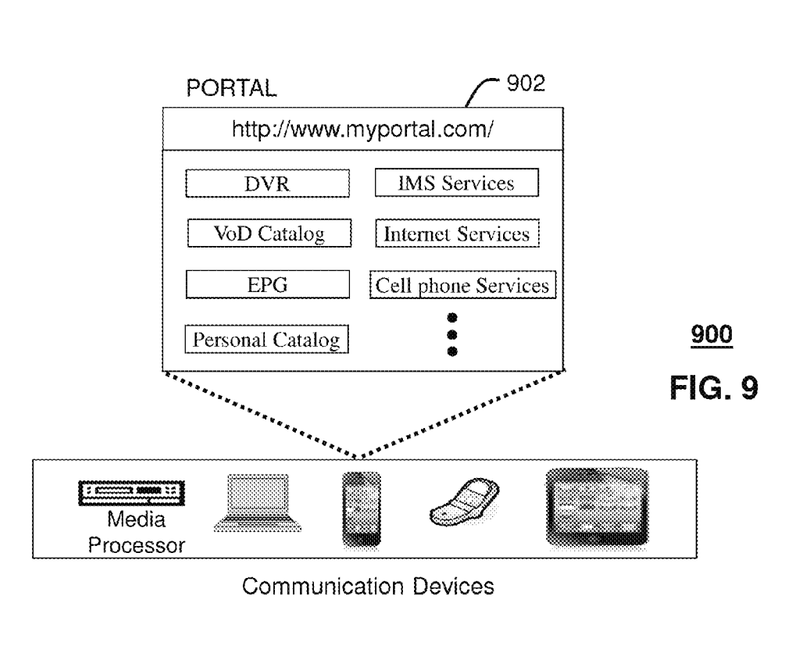
FIG. 9 depicts an illustrative embodiment of a web portal for interacting with client devices included in the communication system of FIG. 8.

FIG. 9 illustrates a communication system 900 including communication devices and an embodiment of a web portal 902 which can be hosted by server applications operating from the computing devices 830 of the communication system 800 illustrated in FIG. 8. The communication devices shown in FIG. 9 are examples of the client devices schematically illustrated in FIGS. 1-5. Communication system 900 can be overlaid or operably coupled with communication system 800 and with the systems schematically illustrated in FIGS. 3 and 4 as another representative embodiment of the disclosure. In an embodiment, ATP reports from the client devices are uploaded to the collectors via portal 902, and messages to delay or prevent publication of additional ATP reports, in accordance with an instruction received from the aggregator device, can be delivered via portal 902. In addition, the web portal 902 can be used for managing services of communication system 800. A web page of the web portal 902 can be accessed by a Uniform Resource Locator (URL) with an Internet browser such as Microsoft's Internet Explorer™, Mozilla's Firefox™, Apple's Safari™, or Google's Chrome™ using an Internet-capable communication device such as those shown in FIGS. 8 and 9. The web portal 902 can be configured, for example, to access a media processor 806 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 806. The web portal 902 can also be used for provisioning IMS services described earlier, provisioning Internet services, provisioning cellular phone services, and so on.

Figure 10:
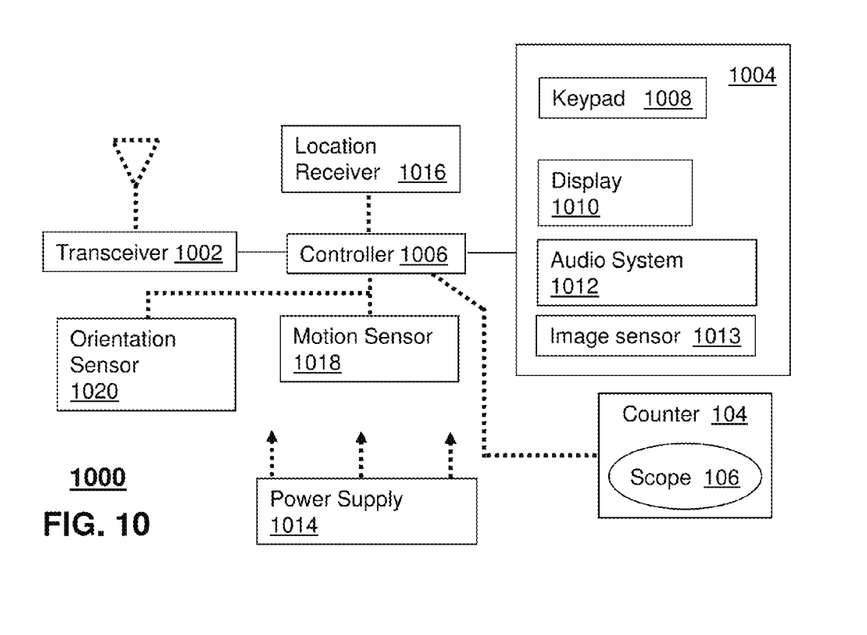
FIG. 10 depicts an illustrative embodiment of a communication device.

FIG. 10 depicts an illustrative embodiment of a communication device 1000. Communication device 1000 can serve in whole or in part as an illustrative embodiment of the devices schematically depicted in FIGS. 1-5. In particular, communication device 1000 can be used to automatically publish diagnostic information regarding quality of a media delivery service to a collector device.

To enable these features, communication device 1000 can comprise a wireline and/or wireless transceiver 1002 (herein transceiver 1002), a user interface (UI) 1004, a power supply 1014, a location receiver 1016, a motion sensor 1018, an orientation sensor 1020, and a controller 1006 for managing operations thereof. The transceiver 1002 can support short-range or long-range wireless access technologies such as Bluetooth, ZigBee, WiFi, DECT, or cellular communication technologies, just to mention a few. Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 1002 can also be adapted to support circuit-switched wireline access technologies (such as PSTN), packet-switched wireline access technologies (such as TCP/IP, VoIP, etc.), and combinations thereof.

The UI 1004 can include a depressible or touch-sensitive keypad 1008 with a navigation mechanism such as a roller ball, a joystick, a mouse, or a navigation disk for manipulating operations of the communication device 1000. The keypad 1008 can be an integral part of a housing assembly of the communication device 1000 or an independent device operably coupled thereto by a tethered wireline interface (such as a USB cable) or a wireless interface supporting for example Bluetooth. The keypad 1008 can represent a numeric keypad commonly used by phones, and/or a QWERTY keypad with alphanumeric keys. The UI 1004 can further include a display 1010 such as monochrome or color LCD (Liquid Crystal Display), OLED (Organic Light Emitting Diode) or other suitable display technology for conveying images to an end user of the communication device 1000. In an embodiment where the display 1010 is touch-sensitive, a portion or all of the keypad 1008 can be presented by way of the display 1010 with navigation features.

The display 1010 can use touch screen technology to also serve as a user interface for detecting user input. As a touch screen display, the communication device 1000 can be adapted to present a user interface with graphical user interface (GUI) elements that can be selected by a user with a touch of a finger. The touch screen display 1010 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 1010 can be an integral part of the housing assembly of the communication device 1000 or an independent device communicatively coupled thereto by a tethered wireline interface (such as a cable) or a wireless interface.

The UI 1004 can also include an audio system 1012 that utilizes audio technology for conveying low volume audio (such as audio heard in proximity of a human ear) and high volume audio (such as speakerphone for hands free operation). The audio system 1012 can further include a microphone for receiving audible signals of an end user. The audio system 1012 can also be used for voice recognition applications. The UI 1004 can further include an image sensor 1013 such as a charged coupled device (CCD) camera for capturing still or moving images.

The power supply 1014 can utilize common power management technologies such as replaceable and rechargeable batteries, supply regulation technologies, and/or charging system technologies for supplying energy to the components of the communication device 1000 to facilitate long-range or short-range portable applications. Alternatively, or in combination, the charging system can utilize external power sources such as DC power supplied over a physical interface such as a USB port or other suitable tethering technologies.

The location receiver 1016 can utilize location technology such as a global positioning system (GPS) receiver capable of assisted GPS for identifying a location of the communication device 1000 based on signals generated by a constellation of GPS satellites, which can be used for facilitating location services such as navigation.

The motion sensor 1018 can utilize motion sensing technology such as an accelerometer, a gyroscope, or other suitable motion sensing technology to detect motion of the communication device 1000 in three-dimensional space. The orientation sensor 1020 can utilize orientation sensing technology such as a magnetometer to detect the orientation of the communication device 1000 (north, south, west, and east, as well as combined orientations in degrees, minutes, or other suitable orientation metrics).

The communication device 1000 can use the transceiver 1002 to also determine a proximity to a cellular, WiFi, Bluetooth, or other wireless access points by sensing techniques such as utilizing a received signal strength indicator (RSSI) and/or signal time of arrival (TOA) or time of flight (TOF) measurements. The controller 1006 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 1000.

Other components not shown in FIG. 10 can be used in one or more embodiments of the subject disclosure. For instance, the communication device 1000 can include a reset button (not shown). The reset button can be used to reset the controller 1006 of the communication device 1000. In yet another embodiment, the communication device 1000 can also include a factory default setting button positioned, for example, below a small hole in a housing assembly of the communication device 1000 to force the communication device 1000 to re-establish factory settings. In this embodiment, a user can use a protruding object such as a pen or paper clip tip to reach into the hole and depress the default setting button. The communication device 1000 can also include a slot for adding or removing an identity module such as a Subscriber Identity Module (SIM) card. SIM cards can be used for identifying subscriber services, executing programs, storing subscriber data, and so forth.

The communication device 1000 as described herein can operate with more or fewer of the circuit components shown in FIG. 10. These variant embodiments can be used in one or more embodiments of the subject disclosure.

The communication device 1000 can be adapted to perform the functions of the media processor 806, the media devices 808, or the portable communication devices 816 of FIG. 8. It will be appreciated that the communication device 1000 can also represent other devices that can operate in communication system 800, such as a gaming console and a media player.

The communication device 1000 shown in FIG. 10 or portions thereof can serve as a representation of one or more of the client devices schematically illustrated in FIGS. 1-4. In particular, the controller 1006 can control a counter 104 to log events in accordance with scope 106, and can upload ATP reports to a collector using transceiver 1002.

Upon reviewing the aforementioned embodiments, it would be evident to an artisan with ordinary skill in the art that said embodiments can be modified, reduced, or enhanced without departing from the scope of the claims described below. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 11:
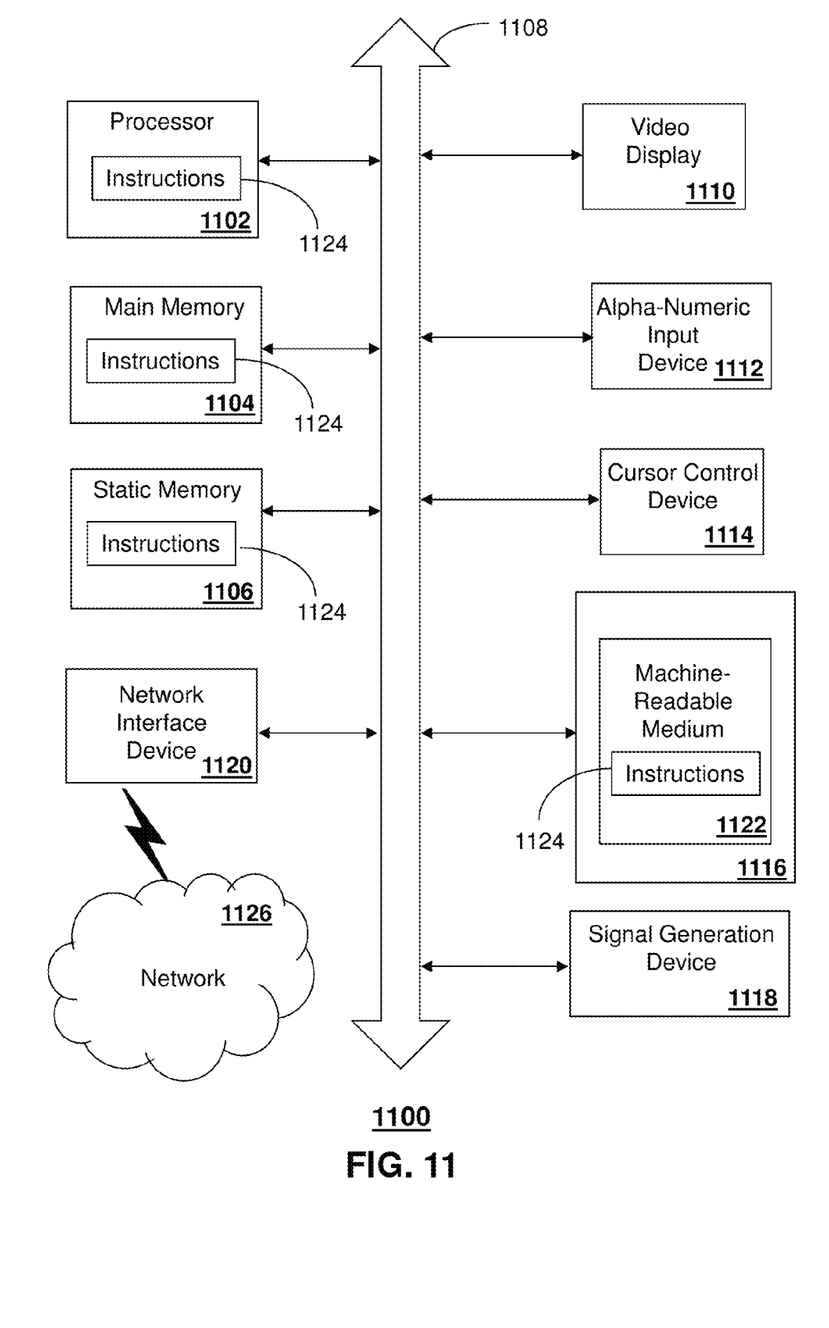
FIG. 11 is a diagrammatic representation of a machine in the form of a computer system within which a set of instructions, when executed, may cause the machine to perform any one or more of the methods described herein.

FIG. 11 depicts an exemplary diagrammatic representation of a machine in the form of a computer system 1100 within which a set of instructions, when executed, may cause the machine to perform any one or more of the methods described above. One or more instances of the machine can operate, for example, as the diagnostic server widget 230, the aggregator 220, the collectors 210, and other devices of FIGS. 1-4. In some embodiments, the machine may be connected (e.g., using a network 1126) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1100 may include a processor (or controller) 1102 (e.g., a central processing unit (CPU), a graphics processing unit (GPU, or both), a main memory 1104 and a static memory 1106, which communicate with each other via a bus 1108. The computer system 1100 may further include a display unit 1110 (e.g., a liquid crystal display (LCD), a flat panel, or a solid state display. The computer system 1100 may include an input device 1112 (e.g., a keyboard), a cursor control device 1114 (e.g., a mouse), a disk drive unit 1116, a signal generation device 1118 (e.g., a speaker or remote control) and a network interface device 1120. In distributed environments, the embodiments described in the subject disclosure can be adapted to utilize multiple display units 1110 controlled by two or more computer systems 1100. In this configuration, presentations described by the subject disclosure may in part be shown in a first of the display units 1110, while the remaining portion is presented in a second of the display units 1110.

The disk drive unit 1116 may include a tangible computer-readable storage medium 1122 on which is stored one or more sets of instructions (e.g., software 1124) embodying any one or more of the methods or functions described herein, including those methods illustrated above. The instructions 1124 may also reside, completely or at least partially, within the main memory 1104, the static memory 1106, and/or within the processor 1102 during execution thereof by the computer system 1100. The main memory 1104 and the processor 1102 also may constitute tangible computer-readable storage media.

Dedicated hardware implementations including, but not limited to, application specific integrated circuits, programmable logic arrays and other hardware devices that can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable array. Furthermore, software implementations (e.g., software programs, instructions, etc.) can include, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 622 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA, LTE) can be used by computer system 1100.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
receiving, by a collector device comprising a processor, diagnostic information from a plurality of client devices delivering media content, wherein the diagnostic information relates to a media delivery service quality;
performing, by the collector device, a data compression procedure for the diagnostic information;
transmitting, by the collector device, compressed data comprising the diagnostic information to an aggregator device; and
sending, by the collector device, to the client devices a message to delay or prevent transmission of additional diagnostic information in accordance with an instruction received from the aggregator device,
wherein the diagnostic information is sent automatically by each client device to the collector device periodically at a variable interval or in accordance with a change of state of the client device, and
wherein the diagnostic information comprises a report of a degradation of the service quality or a fault relating to the service quality.

2. The method of claim 1,
wherein the collector device and the client devices are communicatively coupled in a network distributing media services,
wherein the diagnostic information comprises a plurality of types of data according to a type of client device,
wherein the degradation of the service quality comprises a service outage, a service impairment, or scheduled network maintenance, and
wherein the fault comprises a timing error or a digital rights management error.

3. The method of claim 2,
wherein the media services include video content,
wherein the diagnostic information comprises a log of video content presented at the client device and a channel on which the content was presented, and
wherein the change of state comprises a channel change.

4. The method of claim 1, wherein the message to delay or prevent transmission of additional diagnostic information is sent by the collector device in accordance with a volume of diagnostic information received at the collector device exceeding a predetermined threshold.

5. The method of claim 1, wherein the message to delay or prevent transmission of additional diagnostic information is sent by the collector device in accordance with an instruction received from the aggregator device.

6. The method of claim 5, wherein the instruction is received from the aggregator device in accordance with an alarm signifying a service outage or a service impairment.

7. The method of claim 1, further comprising sending, by the collector device, a first acknowledgment to a client device of reception of the diagnostic information where the first acknowledgment includes a first code, and wherein the message to delay or prevent transmission of additional diagnostic information comprises a second acknowledgment including a second code different from the first code.

8. The method of claim 1, wherein sending the message prevents publication by a client device of additional diagnostic information until expiration of a predetermined interval or a subsequent change of state of the client device.

9. A server comprising:
a memory to store instructions; and
a processor coupled to the memory, wherein the processor, responsive to executing the instructions, performs operations comprising:
receiving client reports published by client devices on a network for delivering media content to the client devices, wherein the client reports comprise diagnostic information relating to a media delivery service quality;
receiving additional reports from network components communicatively coupled to the server relating to the service quality;
correlating the client reports and the additional reports to generate correlated diagnostic data;
identifying a degradation of the service quality or a fault related to the service quality based on the correlated diagnostic data; and
determining that publication of subsequent client reports regarding the degradation of the service quality or the fault is to be delayed or suppressed.

10. The server of claim 9, wherein the client reports are received from an aggregator device, and wherein the client reports are published automatically to a collector device communicatively coupled to the aggregator device.

11. The server of claim 10, wherein the operations further comprise sending, in accordance with the determining, an instruction to the aggregator device that the publication of subsequent client reports regarding the degradation of the service quality or the fault is to be delayed or suppressed.

12. The server of claim 10, wherein the client reports are received from the aggregator as compressed data.

13. The server of claim 9, wherein the degradation of the service quality comprises a service outage, a service impairment, or scheduled network maintenance, wherein the fault comprises a timing error or a digital rights management error, and wherein the operations further comprise sending a message to a network maintenance component signifying an alarm condition.

14. The server of claim 13, wherein the operations further comprise causing the network maintenance component to generate a maintenance ticket to resolve the service outage or service impairment.

15. The server of claim 9, wherein the additional reports comprise server-side logs generated by the network components.

16. A tangible computer-readable storage device comprising executable instructions, which when executed by a processor cause the processor to perform operations comprising:
receiving diagnostic information from a plurality of client devices delivering media content, wherein the diagnostic information relates to a media delivery service quality and wherein the diagnostic information is sent automatically by the client devices;
performing a data compression procedure for the diagnostic information;
transmitting compressed data comprising the diagnostic information to an aggregator device; and
sending to the client devices a message to delay or prevent transmission of additional diagnostic information in accordance with an instruction received from the aggregator device.

17. The tangible computer-readable storage device of claim 16, wherein the diagnostic information is received from each client device periodically at a variable interval or in accordance with a change of state of the client device, and
wherein the diagnostic information comprises a report of a degradation of the service quality or a fault relating to the service quality.

18. The tangible computer-readable storage device of claim 17, wherein the diagnostic information comprises a plurality of types of data according to a type of client device,
wherein the media content is delivered over a network,
wherein the degradation of the service quality comprises a service outage, a service impairment, or scheduled network maintenance, and
wherein the fault comprises a timing error or a digital rights management error.

19. The tangible computer-readable storage device of claim 16, wherein sending the message prevents publication by a client device of additional diagnostic information until expiration of a predetermined interval or a subsequent change of state of the client device.

20. The tangible computer-readable storage device of claim 16, wherein the instruction is received from the aggregator device in accordance with an alarm signifying a service outage or a service impairment.

* * * * *